C. L. ANDERSON.
DISAPPEARING TOP FOR AUTOMOBILE BODIES.
APPLICATION FILED JULY 28, 1914.

1,156,738.

Patented Oct. 12, 1915.
3 SHEETS—SHEET 1.

Witnesses
Otto E. Hoddick.
Mase Kirby

Inventor
Charles L. Anderson.
By A. J. O'Brien
Attorneys

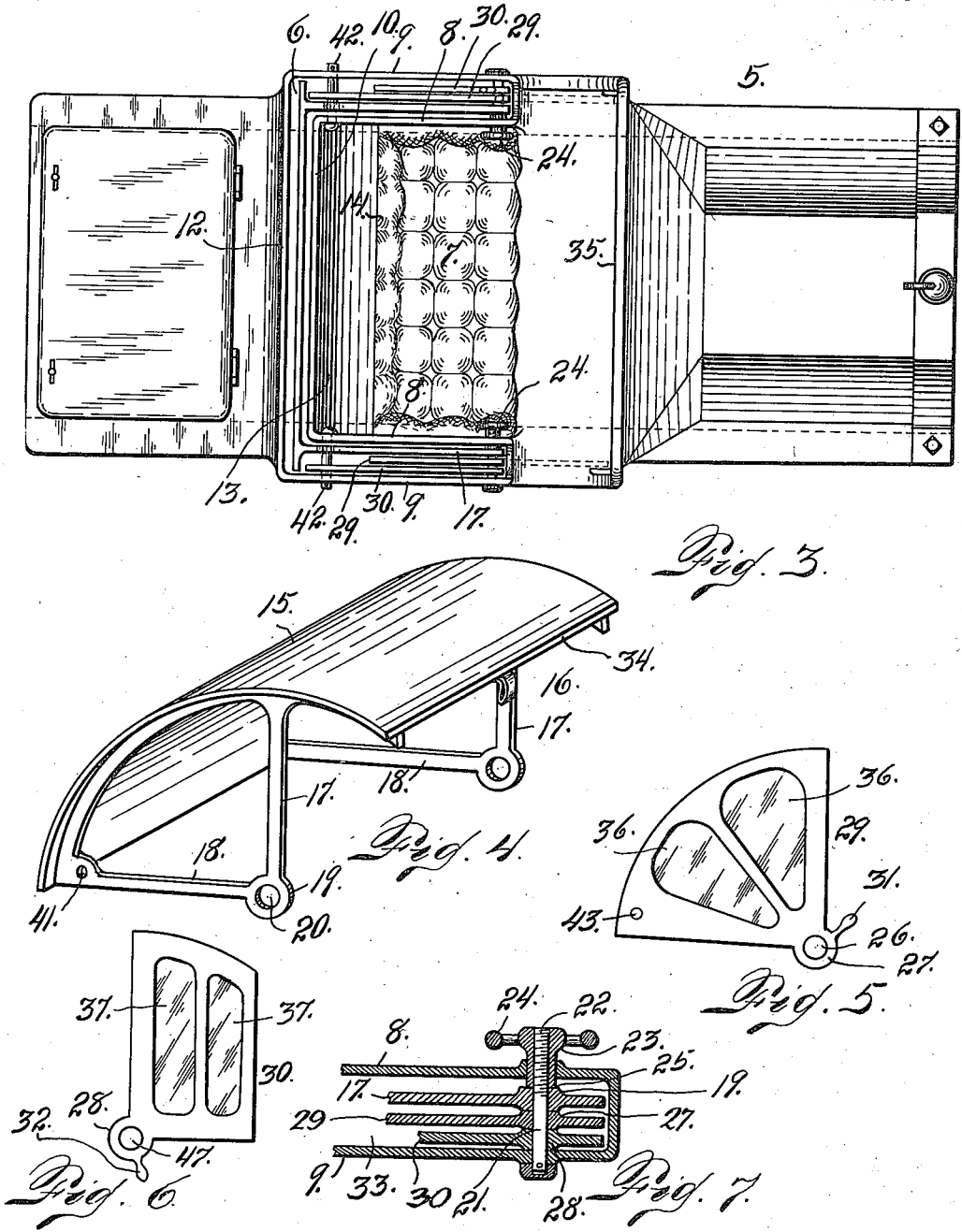

C. L. ANDERSON.
DISAPPEARING TOP FOR AUTOMOBILE BODIES.
APPLICATION FILED JULY 28, 1914.
1,156,738.
Patented Oct. 12, 1915.
3 SHEETS—SHEET 3.
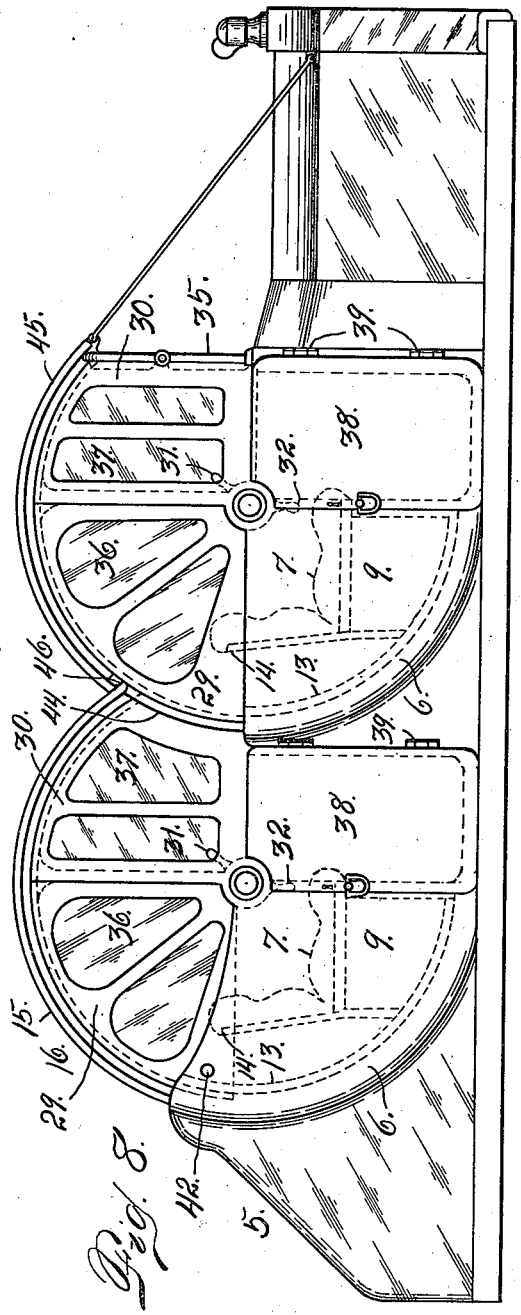
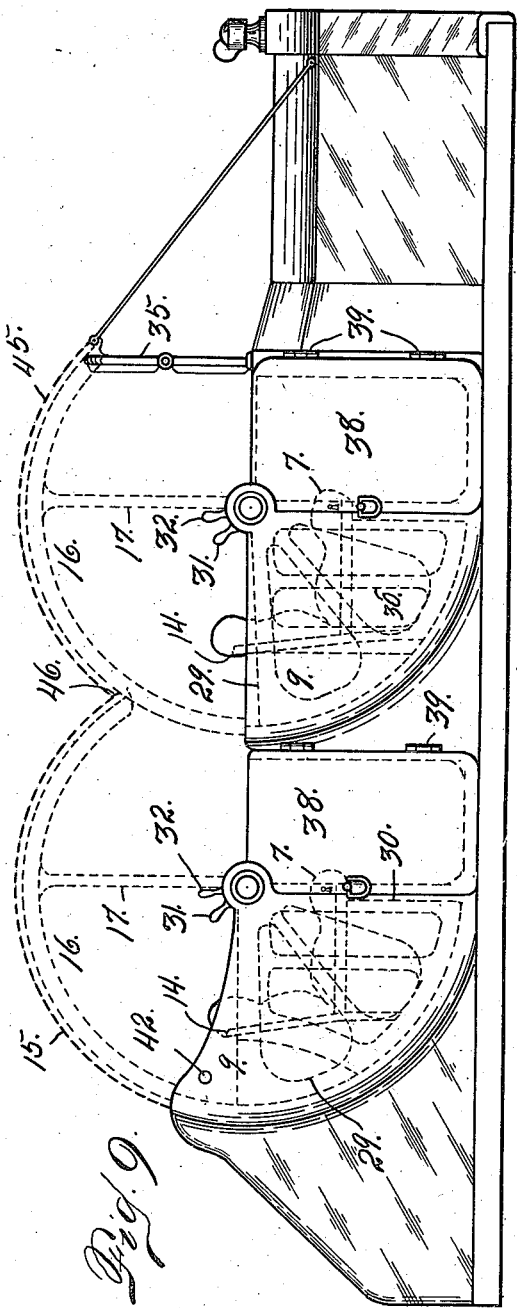

UNITED STATES PATENT OFFICE.

CHARLES L. ANDERSON, OF DENVER, COLORADO.

DISAPPEARING TOP FOR AUTOMOBILE-BODIES.

1,156,738.  Specification of Letters Patent.  Patented Oct. 12, 1915.

Application filed July 28, 1914. Serial No. 853,601.

*To all whom it may concern:*

Be it known that I, CHARLES L. ANDERSON, a citizen of the United States, residing in the city and county of Denver and State of Colorado, have invented certain new and useful Improvements in Disappearing Tops for Automobile-Bodies; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in automobile bodies.

My improvement consists in providing an adjustable top whereby the body of the automobile may be completely closed both at the top and sides when desired; while, when the use of the top for closing purposes is not required, the top portions may be entirely concealed within a pocket or pockets formed in the body of the machine, the said pocket being curved to conform to the curvature of the main portion of the adjustable top.

Having briefly outlined my improved construction, I will proceed to describe the same in detail, reference being made to the accompanying drawing, in which is illustrated an embodiment thereof.

Figure 1:
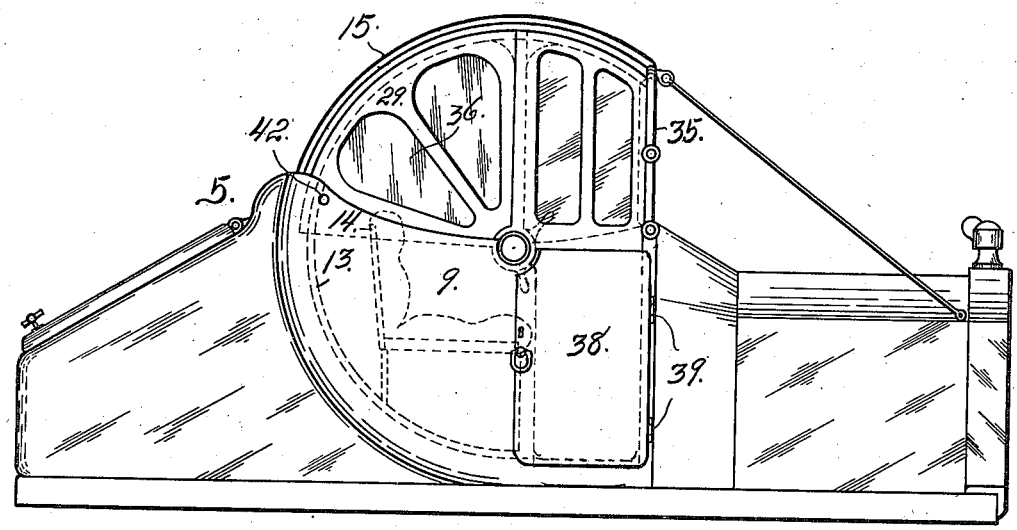
Figure 2:
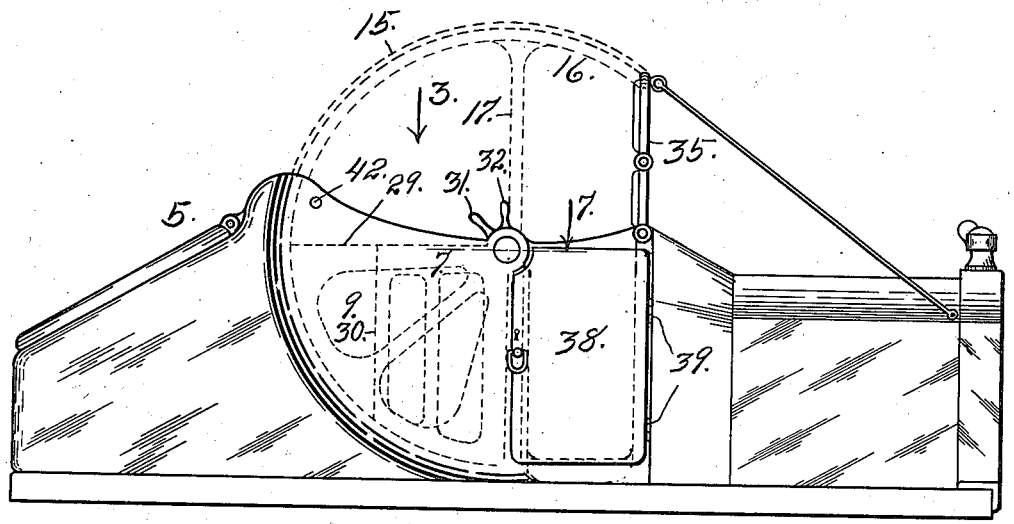

In this drawing,—Figure 1 is a side elevation of one form of my improvement, being that employed with an automobile having a single seat. Fig. 2 is a similar view showing the disappearing top concealed, its raised position however, being shown by dotted lines. Fig. 3 is a top plan view of the construction, or a view looking in the direction of arrow 3, Fig. 2. Fig. 4 is a perspective view of the main portion of the disappearing top. Figs. 5 and 6 are views of parts of the closable disappearing top which coöperate with the main part when the construction is assembled. Fig. 7 is a fragmentary section taken on the line 7—7, Fig. 2. Fig. 8 is a view similar to Fig. 1, showing my improvement applied to a double seated automobile body. In this view, the top is adjusted to completely close the passenger space. Fig. 9 is a similar view with the parts of the disappearing top concealed, the raised or closed portion being indicated by dotted lines.

The same reference characters indicate the same parts in all the views.

Referring first more particularly to Figs. 1 to 7, inclusive, let the numeral 5 designate an automobile body provided with a pocket 6 arranged on both sides and in the rear of the seat 7. This pocket is formed by inner and outer casing members 8 and 9 on each side, and inner and outer casing members 10 and 12 in the rear. The side casing members 8 and 9 are substantially vertically disposed, while the rear casing member 10 is curved as shown at 13, as it extends downwardly and forwardly, leaving a space between the rear member 10 and the back 14 of the seat. The rear portion of the pocket 6 is curved to conform to the general shape of the upper portion 15 of the main top part 16 of the structure. This main top part consists of the curved portion 15 which is provided on opposite sides with arms 17 and 18 which are connected at 19, the parts 19 being perforated as shown at 20 to engage pins 21 mounted in the oppositely disposed parts 8 and 9 on opposite sides of the seat. These pins are secured at the forward extremities of the parts 8 and 9 on opposite sides, while their inner portions are threaded, as shown at 22, to receive nuts 23 whose inner extremities are provided with hand-wheels 24 to facilitate adjustment. The outer extremities of these nuts are provided with shoulders 25 which engage the perforated parts 19 of the main top member. These pins 21 also pass through perforations 26 and 47 formed in hub portions 27 and 28 of adjustable members 29 and 30 of the adjustable disappearing top structure, the said hub portions being provided with hand pieces 31 and 32 for convenience of adjustment.

When the parts are assembled, the hub portions 27 and 28 of the members 29 and 30 are in direct engagement with each other within the side portions 33 of the pocket 6, while the corresponding parts 19 of the top part 16 are in engagement with the part 27. Again, the part 28 of each member 30 is in direct engagement with the adjacent side wall 9, while the outer extremity of each nut 23 is in engagement with the adjacent perforated part 19 of the main body member 16. Hence, by turning the nut 23 in the proper direction for tightening purposes, the parts 19, 27 and 28 may be clamped by the nut and the adjacent side member 9, whereby the said parts 16, 29 and 30 may be locked in any desired position of adjustment.

When the main member 16 is in its raised position and at its forward limit of movement, its forward edge 34 bears against the upper extremity of the wind shield 35 of the automobile body. The member 29 is sector shaped and provided with transparent portions 36. This member 29 when in the elevated position, is arranged to close an opening of counterpart shape surrounded by the curved part 15 and the two arms 17 and 18 on each side of the main top member 16. Again, when the parts 30 are in the raised position, they are adapted to close the top portion of the automobile body between the arms 17 in the rear and the wind shield in front. The part 30 is also provided with transparent portions 37 of suitable size, or area. From this it will be seen that when the members 29 and 30 are employed in conjunction with the member 16, the upper portion of the body of the automobile may be completely closed, while the lower portion on one side may be provided with a door 38 hinged at 39 which may be opened when desired. This door, however, may be locked in the closed position when the machine is left alone, thus making it impossible for anyone to enter the machine who does not have a key for the lock.

While the nuts 23 on opposite sides are adapted to secure the adjustable disappearing top members 16, 29 and 30 in any desired position, it may be advisable to employ a suitable locking device in the rear, and to this end the top member 16 is provided on opposite sides with a perforation 41 adapted to receive a pin 42 which also passes through registering openings 43 formed in the adjacent member 29 and also through the inner and outer members 8 and 9 of the casing, constituting the walls of the side portions 33 of the pocket. These pins provide an additional support for the top members 16 and 29, and they also give stiffness and rigidity to the inner wall of the pocket composed of the side parts 8 and the rear part 10, as heretofore described. When the parts 16, 29 and 30 are concealed, the pins may be inserted in the openings formed in the walls 8 and 9 where they are conveniently accessible for use, if desired, when the adjustable top parts are in their closed or elevated positions.

In the form of construction shown in Figs. 8 and 9, I have illustrated my improvement as applied to a double seated automobile body in which the construction disclosed in the other views is substantially duplicated. The closure for the rear portion of the passenger space in the body is nearly identical with that shown in Figs. 1 to 7 inclusive, except that the front edge of the part 30 is curved as shown at 44 to conform to the curvature of the rear edges of the forward adjustable members 29 which are substantially of the construction of the correspondingly designated members in the other form. However, the main top member 45 which corresponds with the top member 16, is somewhat shorter than the last named member and when this member 45 is in the raised or closed position, its rear edge engages the forward extremity 46 of the rear member 16. In this manner, the part 45 is supported. The forward side parts 30 in Figs. 8 and 9 are substantially of the construction of the correspondingly designated parts in the other form of construction. The doors in Figs. 8 and 9 may be given the same reference character as those in the other form, as they perform substantially the same function. It should be stated however, that in Figs. 8 and 9, these doors are arranged to completely close the passenger space within the body of the machine, when the top portions are in the raised or closed position, as shown in Fig. 8. In other respects, the construction shown in Figs. 8 and 9 is substantially the same as disclosed in the other views and need not be further described in detail.

Having thus described my invention, what I claim is,—

1. A vehicle body including walls hollow at both sides and in the rear, and a top member adjustable to enter the pocket of the hollow walls or to close the top of the body, as may be desired, the said member having arms hinged at their forward extremities and spaced to form side openings and hinged side members adjustable independently of the top member to enter said pocket at the sides and also to close the side openings of the first named top member.

2. A vehicle body including walls hollow at both sides and in the rear, a top member adjustable to enter the pocket of the hollow walls or to close the top of the body, as may be desired, the said member having arms hinged at their forward extremities and spaced to form side openings, hinged side members adjustable to enter said pocket at the sides and also to close the side openings of the first named top member, additional side members adapted to occupy a position in front of the first named members, and also adjustable to enter the side portions of the said pocket, and means for securing the side and top members in the desired position of adjustment.

3. A vehicle body having hollow walls and coaxially hinged top and side members adapted to enter the pocket of the walls and adjustable independently of each other to close the body at the top and sides.

4. A vehicle body having hollow walls and coaxially hinged top and side members adapted to enter the pocket of the walls and adjustable independently of each other to close the body at the top and sides, and means for securing the said members in the desired position of adjustment.

5. A vehicle body having hollow walls and coaxially hinged top and side members adapted to enter the pocket of the walls and adjustable independently of each other to close the body at the top and sides, and means for securing the said members in the desired position of adjustment, said means including a clamping nut threaded in the hinged pin of the members.

6. A vehicle body having a pocket on opposite sides and in the rear of the seat, a hinged member adjustable to occupy said pocket or close the body at the top, as may be desired, the said member including a curved transverse outer portion adapted to enter the rear portion of the pocket, and co-operating coaxially hinged members adjustable independently of the first named hinged member to occupy the pocket and close the body at the sides.

7. A vehicle body having a pocket on opposite sides and in the rear of the seat, a hinged member adjustable to occupy said pocket or close the body at the top, as may be desired, the said members including a curved transverse outer portion adapted to enter the rear portion of the pocket, and co-operating coaxially hinged members adjustable independently of the first named hinged member to occupy the pocket and close the body at the sides, the side closure members having transparent portions, substantially as described.

In testimony whereof I affix my signature in presence of two witnesses.

CHARLES L. ANDERSON.

Witnesses:
 MAZE KIRBY,
 A. J. O'BRIEN.